D. J. DEMAS.
FASTENING MEANS FOR TIRE CHAINS.
APPLICATION FILED JAN. 3, 1920.

1,361,693.

Patented Dec. 7, 1920.

Inventor
Demetreos J. Demas

Attorney

D. J. DEMAS.
FASTENING MEANS FOR TIRE CHAINS.
APPLICATION FILED JAN. 3, 1920.

1,361,693.

Patented Dec. 7, 1920.
3 SHEETS—SHEET 2.

Inventor
Demetreos J. Demas

By C. M. Parken
Attorney

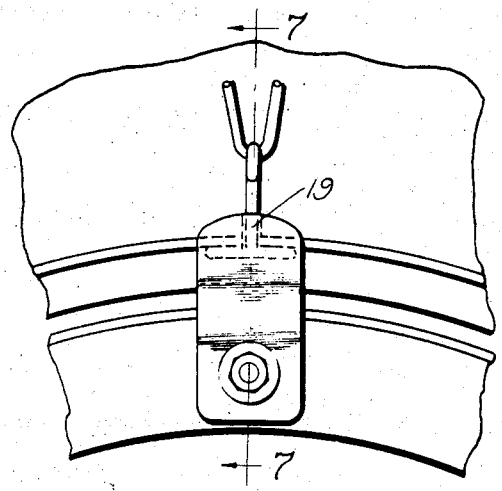
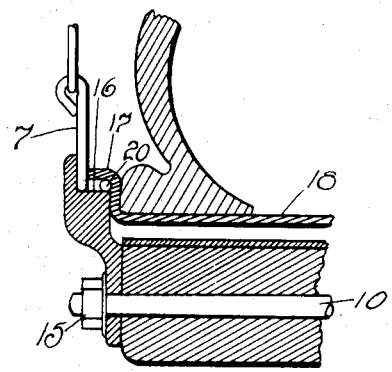
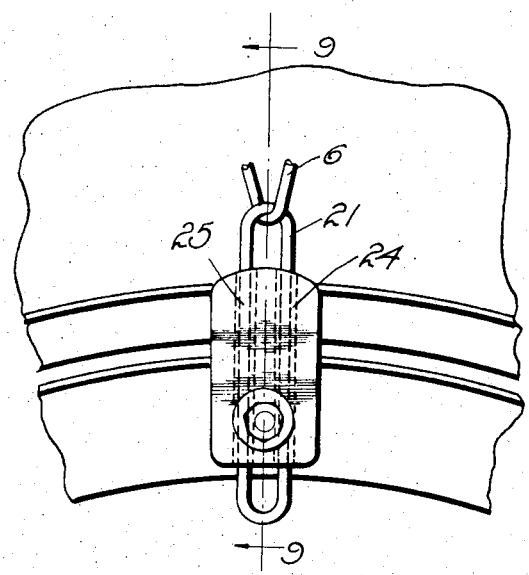
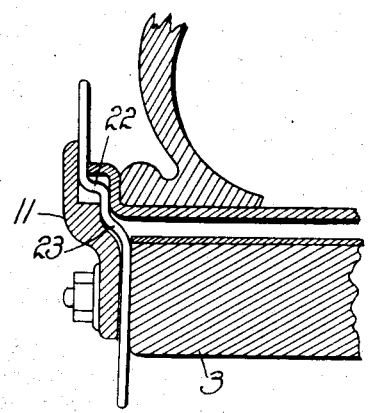
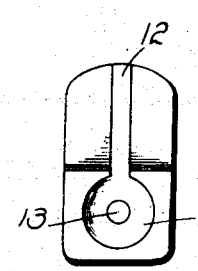

UNITED STATES PATENT OFFICE.

DEMETREOS J. DEMAS, OF PITTSBURGH, PENNSYLVANIA.

FASTENING MEANS FOR TIRE-CHAINS.

1,361,693.   Specification of Letters Patent.   Patented Dec. 7, 1920.

Original application filed February 21, 1919, Serial No. 278,392. Divided and this application filed January 3, 1920. Serial No. 349,206.

*To all whom it may concern:*

Be it known that I, DEMETREOS J. DEMAS, a citizen of the United States, residing at Pittsburgh, in the county of Allegheny and State of Pennsylvania, have invented certain new and useful Improvements in Fastening Means for Tire-Chains, of which the following is a specification.

This invention relates to fastening means for tire chains, and it comprises a bolt or lug projecting from the felly of the wheel at each side, in combination with a chain adapted to be arranged transversely of the tire, said chain being provided with U-shaped fastening elements at each end, a fastening device secured to each of said elements, and held in place by said bolts, and a securing plate arranged over said fastening device and held in place by said bolt, said securing plate being provided with recesses for the reception of said fastening device, all as more fully hereinafter set forth and as claimed.

This application is a division of my copending application for improvements in resilient tires filed February 21st, 1919, Serial No. 278,392, which has since become Patent No. 1,337,443, dated April 20, 1920. In the present invention I have devised simple and efficient means for securely fastening nonskid chains to tires. The device is of simple construction, can be readily applied when needed and can easily be removed when desired.

In the accompanying drawings I have shown several embodiments of this invention. In the showing Figure 1 is a side elevation of a wheel with a tire applied thereto showing one form of the invention.

Fig. 6 is a side elevation of a portion of the tire showing another modification.

Fig. 7 is a transverse sectional view on the line 7—7 of Fig. 6.

Fig. 8 is a side elevation on the portion of a tire showing another form of the invention.

Fig. 9 is a transverse sectional view on the line 9—9 of Fig. 8, and

Fig. 10 is a side elevation of the securing plate employed in connection with the form illustrated in Figs. 1 to 5.

Figure 1:
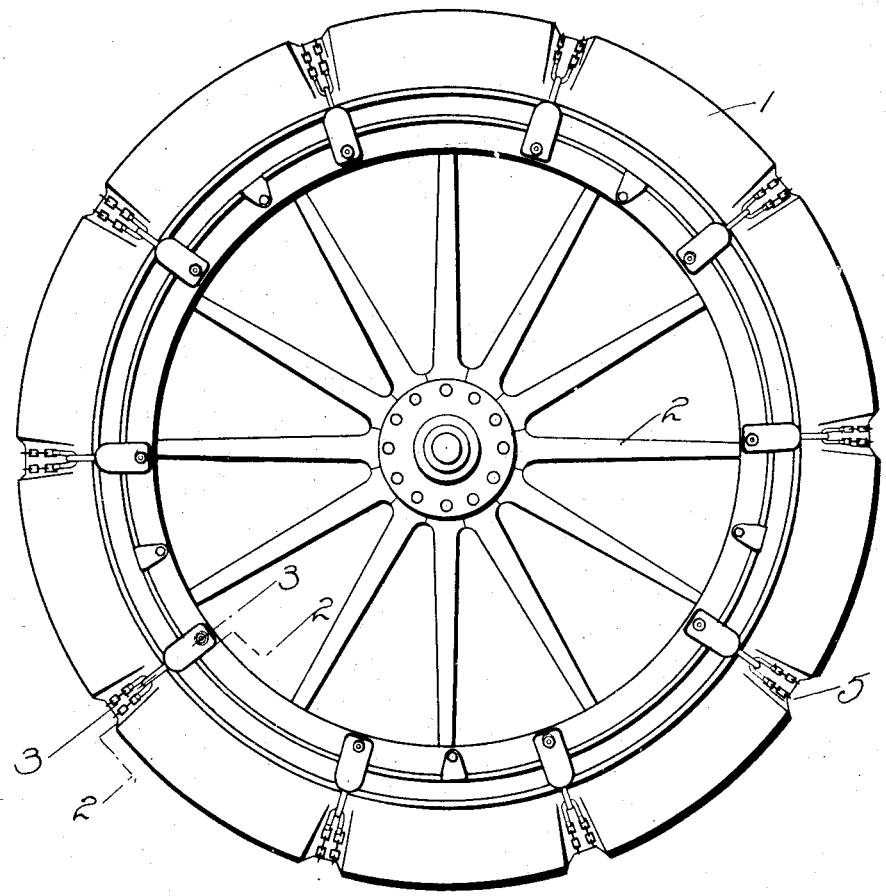
Figures 2, 3:
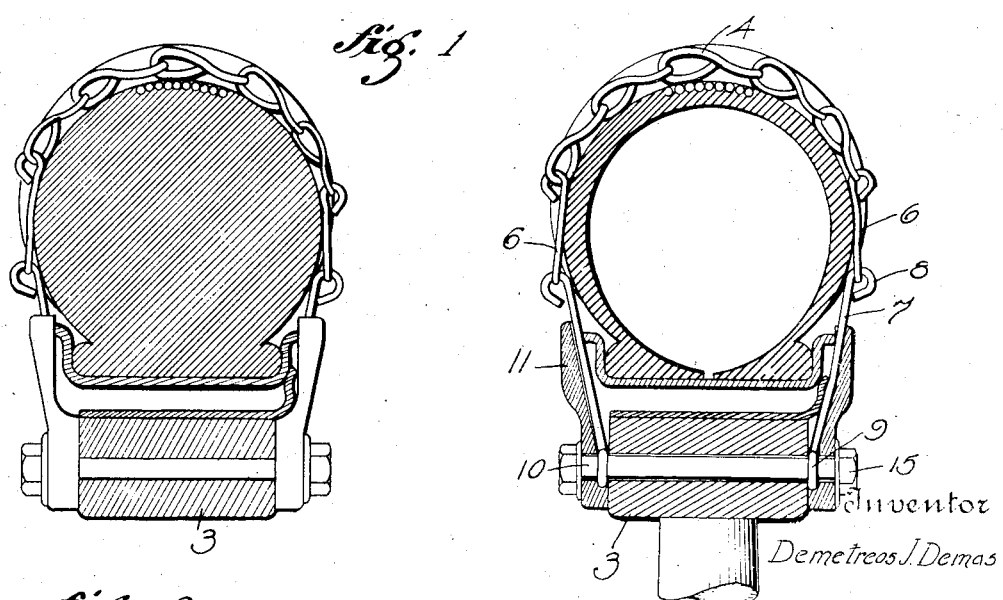
Fig. 2 is a sectional view taken on the line 2—2 of Fig. 1.
Fig. 3 is a sectional view on the line 3—3 of Fig. 1.
Figure 4:
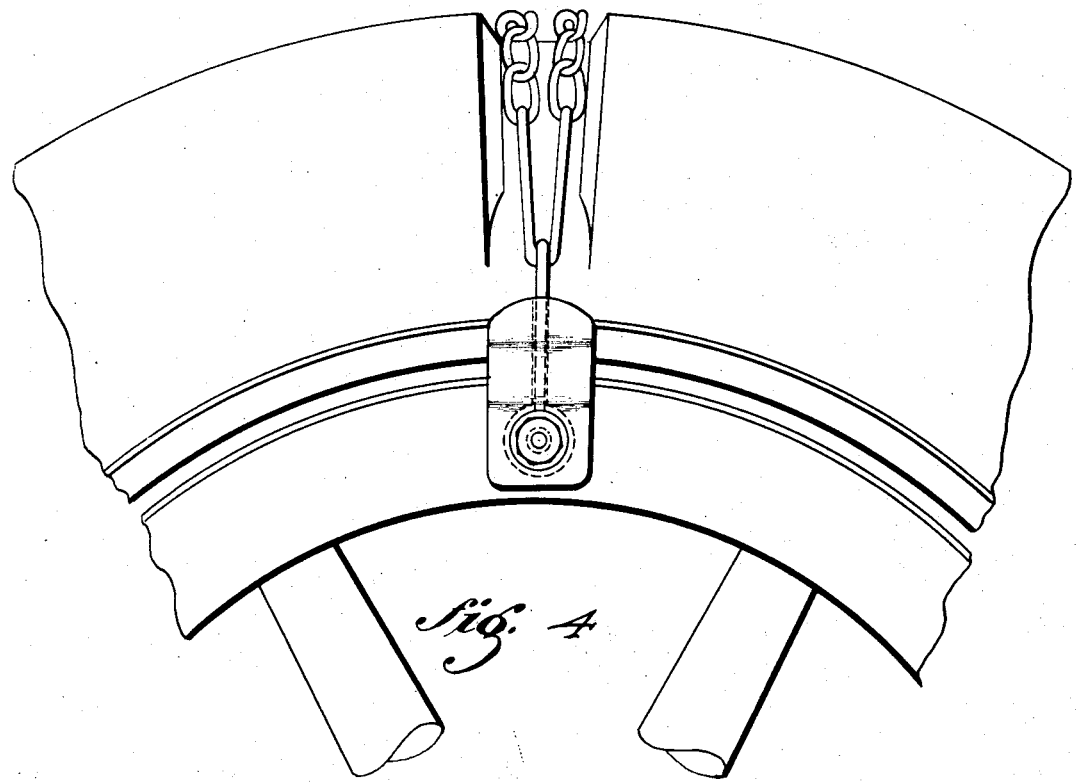
Fig. 4 is a side elevation of a portion of a wheel and tire showing the device on an enlarged scale.
Figure 5:
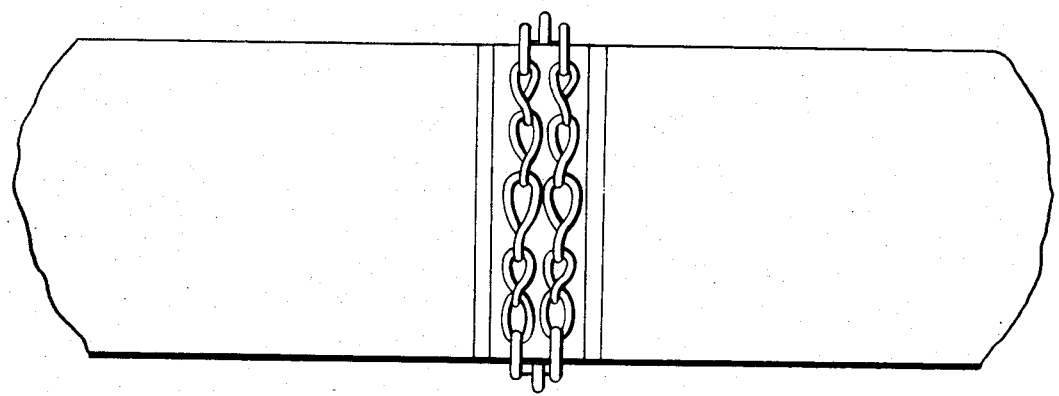
Fig. 5 is a plan view thereof.

Referring to Fig. 1 of the drawings, the reference numeral 1 generally designates a tire which is arranged upon a wheel 2. The tire may be of any type, and as shown in Fig. 2 of the drawings the invention is illustrated as applied to the solid cushion tire. In Fig. 3 of the drawings the tire is of a pneumatic type. The wheel is provided with felly 3, (see Figs. 2 and 3) and a nonskid chain 4 is arranged over the tread of the tire and received in recesses 5 in the tread portion. The particular type of tire herein illustrated and the particular type of nonskid chain form no part of the present invention, being claimed in my copending application. It will be apparent that the securing means herein claimed may be employed in connection with nonskid chains on any type of tire, and may be employed in connection with any form of nonskid chain.

As shown, the chain consists of two substantially parallel sections provided with U-shaped elements 6 at each side. The fastening device 7 is provided with a hooked end 8 adapted to be received in the U-shaped section. The opposite end of the fastening device is provided with an eye 9 for the reception of a threaded lug or bolt 10 projecting from the side of the felly. The securing plate 11 is arranged over the fastening device and this securing plate is provided with a longitudinal recess 12 (see Fig. 10) for the reception of the fastening device. The securing plate is provided with an aperture 13 for the reception of the bolt and a circular depression or groove 14 is arranged near this aperture for the reception of the eye 9 formed on the end of the fastening device. Nuts 15 are adapted to be placed on the threaded lugs, and it will be apparent when the nuts are tightened the nonskid chain will be securely held in position.

Referring to Figs. 6 and 7 of the drawings, as herein shown the longitudinal recesses in the securing plate are omitted. As shown the securing plate is secured to the wheel by bolts 10 and nuts 15. The inner side of the securing plate is provided with a shoulder 16 adapted to coact with the flange 17 formed on the rim 18 on the wheel. The securing device 7 is received in a longitudinal groove 19 extending from the upper edge of the securing plate to the shoulder 16. The securing device is provided with a horizontal offset portion 20 which is received beneath the flange of the rim for holding it in position.

As shown in Figs. 8 and 9 of the drawing the securing device comprises a loop 21. This loop passes through the U-shaped portion 6 arranged on the end of the chain and is received between the securing plate 11 and the felly 3. As shown, it is provided with offsets 22 and 23 shaped to fit beneath the rim and the flange formed on the rim for securing it in position. It is received in grooves or recesses 24 and 25 formed in the securing plate.

The operation of this device will be readily apparent to one skilled in the art and further description thereof is deemed unnecessary. It is obvious that the means herein described and illustrated produces a very efficient construction for fastening antiskid chains to vehicle tires, and with that the device may be readily applied or removed.

As stated, the device is susceptible of use in connection with any type of tire, either pneumatic, solid, or cushioned, and may be employed with any type of chain. It will be apparent that the device can be employed in connection with a tire chain consisting of a plurality of elements joined together and extending entirely around the circumference of the tire. When employed with this type of chain it is merely necessary to provide fastening means at intervals upon each side of the chain.

It is understood that the above disclosure merely illustrates certain advantageous embodiments of the invention and that various changes may be made in the detail construction and arrangement of parts without departing from the spirit of the invention or the scope of the subjoined claims.

What I claim is:

1. A fastening device for antiskid chains for tires, comprising threaded projections carried by the felly of the wheel, fastening devices secured to the end of said chain, securing plates arranged on said projections, said securing plates being provided with recesses for the reception of the fastening elements and means for securing said plates on the threaded projections.

2. In combination with a wheel and a tire mounted thereon, anti-skid chains arranged transversely of said tire, and fastening means for said chains, said means comprising threaded projections carried by the wheel, a securing plate mounted on each of said threaded projections and a fastening device, said fastening device being secured to the end of the chain, the securing plate being provided with recesses on the inner side, said fastening device being adapted to be positioned in said recesses.

3. In combination with a wheel and a tire mounted thereon, anti-skid chains arranged transversely of said tire, and fastening means for said chains, said means comprising threaded projections carried by the wheel, a securing plate mounted on each of said threaded projections, and a fastening device, said fastening device being secured to the end of the chain, and extending between said securing plate and the felly of the wheel, the securing plate being provided with recesses for the reception of said fastening device.

4. In combination with a wheel and a tire mounted thereon, anti-skid chains arranged transversely of said tire, and fastening means for said chains, said means comprising threaded projections carried by the wheel, a securing plate mounted on each of said threaded projections, and a fastening device, said fastening device being secured to the end of the chain, and extending between said securing plate and the felly of the wheel, an eye formed on the end of the fastening device and adapted to be received by said threaded lug, the securing plate being provided with recesses for the reception of said fastening device.

5. In combination with a wheel and a tire mounted thereon, anti-skid chains arranged transversely of said tire, and fastening means for said chains, said means comprising threaded projections carried by the wheel, a securing plate mounted on each of said threaded projections, and a fastening device, said fastening device being secured to the end of the chain, and extending between said securing plate and the felly of the wheel, an eye formed on the end of the fastening device and adapted to be received by said threaded lug, the securing plate being provided with recesses for the reception of said fastening device, and an annular depression in said securing plate for the reception of the end of said fastening device.

In testimony whereof I affix my signature in presence of two witnesses.

DEMETREOS J. DEMAS.

Witnesses:
J. L. PARKER,
G. WILLIAM JONES, Jr.